United States Patent [19]

Gideon et al.

[11] Patent Number: 5,017,054
[45] Date of Patent: May 21, 1991

[54] DELIVERY LINE FOR THE CONVEYING OF VISCOUS OR PASTY MATERIAL

[75] Inventors: Jurgen Gideon, Verden/Aller; Dieter Krieger, Langwedel-Etelsen; Erich Mengel, Verden/Borstel, all of Fed. Rep. of Germany

[73] Assignee: Effem GmbH, Verden/Aller, Fed. Rep. of Germany

[21] Appl. No.: 458,651

[22] PCT Filed: Apr. 19, 1989

[86] PCT No.: PCT/DE89/00238
  § 371 Date: Dec. 21, 1989
  § 102(e) Date: Dec. 21, 1989

[87] PCT Pub. No.: WO89/10515
  PCT Pub. Date: Nov. 2, 1989

[30] Foreign Application Priority Data

Apr. 22, 1988 [DE] Fed. Rep. of Germany ....... 3813574

[51] Int. Cl.⁵ .................. B65G 53/52; B65G 53/66
[52] U.S. Cl. ...................... 406/191; 406/10; 406/12; 138/26; 138/31; 138/155; 285/114; 285/93
[58] Field of Search .................. 406/191, 195, 10, 116, 406/167, 154, 52, 12, 14, 19; 137/568; 141/266; 138/26, 31, 155; 285/114, 115, 93; 60/329

[56] References Cited

FOREIGN PATENT DOCUMENTS 330236 2/1919 Fed. Rep. of Germany ........ 138/31

*Primary Examiner*—Margaret A. Forcarino
*Assistant Examiner*—James M. Kannofsky
*Attorney, Agent, or Firm*—Curtis, Morris & Safford

[57] ABSTRACT

A delivery line for conveying viscous or pasty material to be filled into a food can or the like from a conveyor pump to a filling machine, having a delivery path developed in the form of a trombone tube with two sections extending parallel to each other and a U-shaped arch, the legs of which cooperate telescopically with the two sections. A pneumatic or hydraulic piston unit is provided to act on the U-shaped arch against the pressure of the filling material in the direction toward a shortening of the delivery path.

4 Claims, 3 Drawing Sheets

DELIVERY LINE FOR THE CONVEYING OF VISCOUS OR PASTY MATERIAL

BACKGROUND OF THE INVENTION

The present invention relates to a delivery line for conveying viscous or pasty material which is to be filled into a food can or the like from a conveyer pump to a filling machine.

In the case of viscous or pasty materials which are to be filled into food cans or the like, the problem arises that variations in the pressure in the delivery line which result in variations in the delivery capacity and/or the filling capacity considerably impair the filling process.

OBJECTS OF THE INVENTION

The object of the invention is to make the pressure in the delivery line uniform.

SUMMARY OF THE INVENTION

In accordance with the invention, this object is achieved by a path developed in the form of a trombone tube having two sections, which extend parallel to each other, and a U-shaped arch, the legs of which cooperate telescopically with the sections. Means are also provided which act on the U-shaped arch in the direction towards shortening of the path against the pressure of the material being conveyed.

In a preferred embodiment the means which act on the U-shaped arch is formed by a pneumatic or hydraulic cylinder/piston unit.

Furthermore, means for detecting the instantaneous length of the path can be provided. One particular preferred embodiment is characterized by the path extending in a vertical plane and being provided with a vent device at the highest point of the U-shaped arch.

BRIEF DESCRIPTION OF THE DRAWINGS

Further features and advantages of the invention will become evident from the following description in which one embodiment of the invention is explained with reference to the drawing, in which.

DETAILED DESCRIPTION OF THE PREFERRED EMBODIMENT

Figure 1:
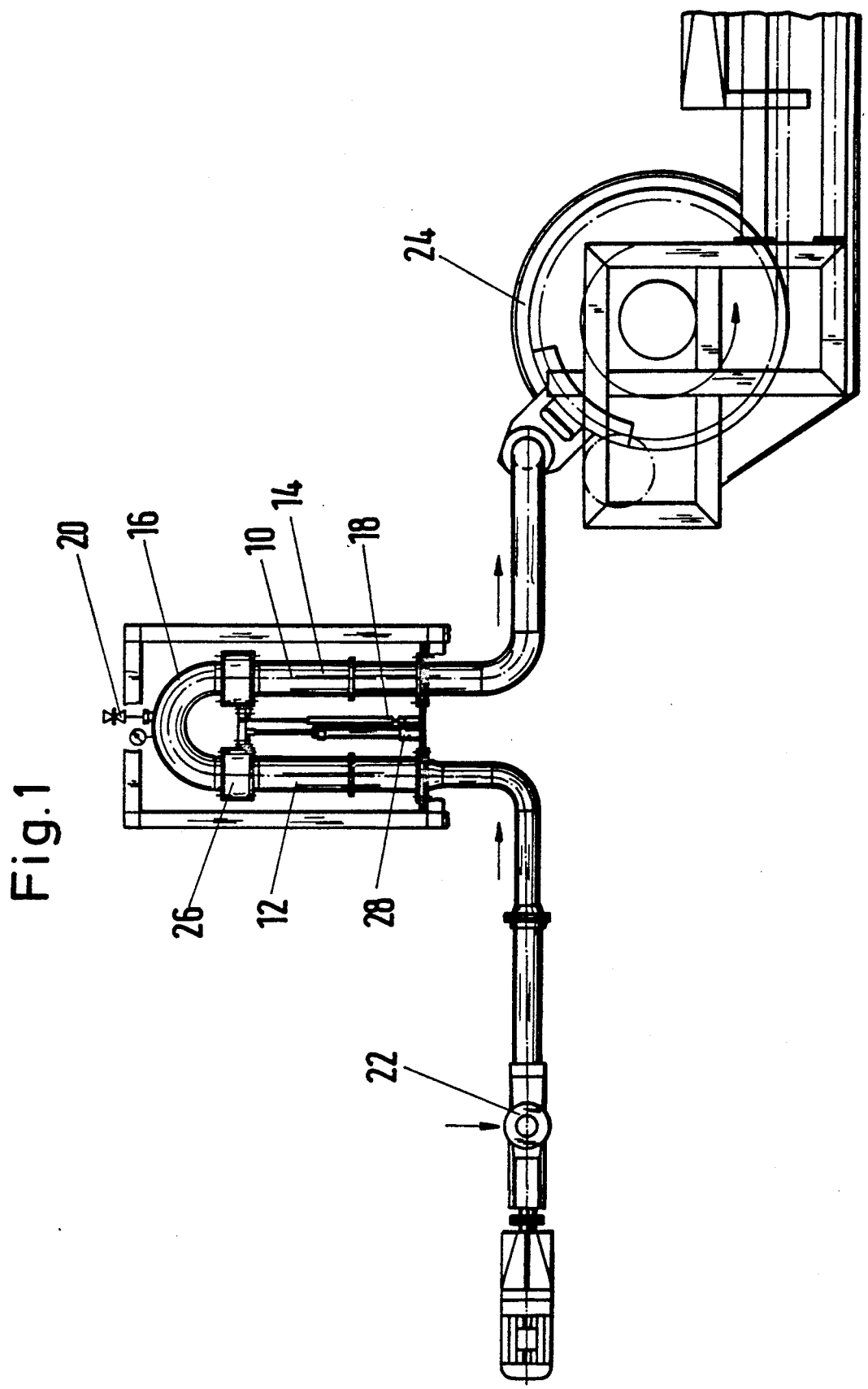
FIG. 1 is an overall view of the delivery line.

A delivery line which connects a delivery pump 22 with a filling machine 24 is provided with a path 10 which is formed by two parallelly extending straight sections 12, 14 and a U-shaped arch 16. The legs of the U-shaped arch 16 are telescopically displaceable in the straight sections 12, 14. The path 10 has a hydraulic or pneumatic cylinder/piston unit 28 which acts on flanges 26 attached to the arch 16 and exerts a force on the arch 16 which retracts the legs thereof into the straight sections 14, 16 of the path 10. The path 10 is also provided with a sensing means 18 which extends parallel to the piston/cylinder unit 28 and detects the instantaneous length of the path 10.

The path 10 maintains the pressure in the delivery line uniform. When the output of the delivery pump 22 exceeds the filling capacity of the filling machine 24, the pressure in the delivery line increases. This has the result of moving the U-shaped arch 16 against the force of the cylinder/piston unit out of the straight sections 12, 14 of the path 10 to lengthen the path 10. When this takes place the lengthening of the path 10 permits the pressure in the delivery line to drop. When the pressure in the delivery line, on the other hand, decreases, due to a reduction in the pump output, the U-shaped arch 16 will move back into the straight sections 12, 14 of the path 10 due to the force exerted by the piston/cylinder unit 28. This results in a shortening of the length of the path 10 and thus increases the pressure in the delivery line. The continuous adaptation of the length of the path 10 to the corresponding delivery pressure therefore results in maintaining the delivery pressure uniform.

Figure 2:
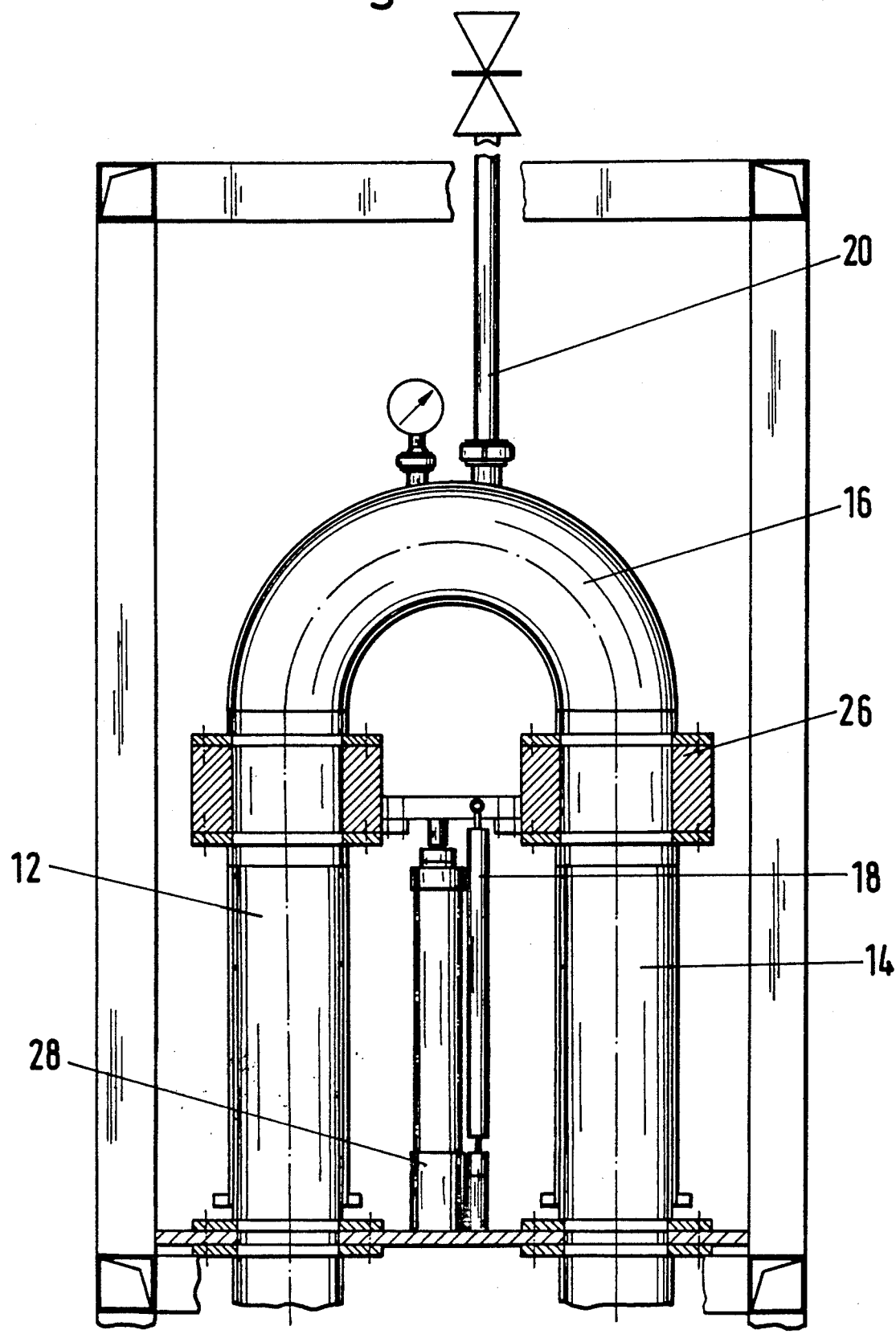
FIG. 2 is a view of the path in retracted condition.
Figure 3:
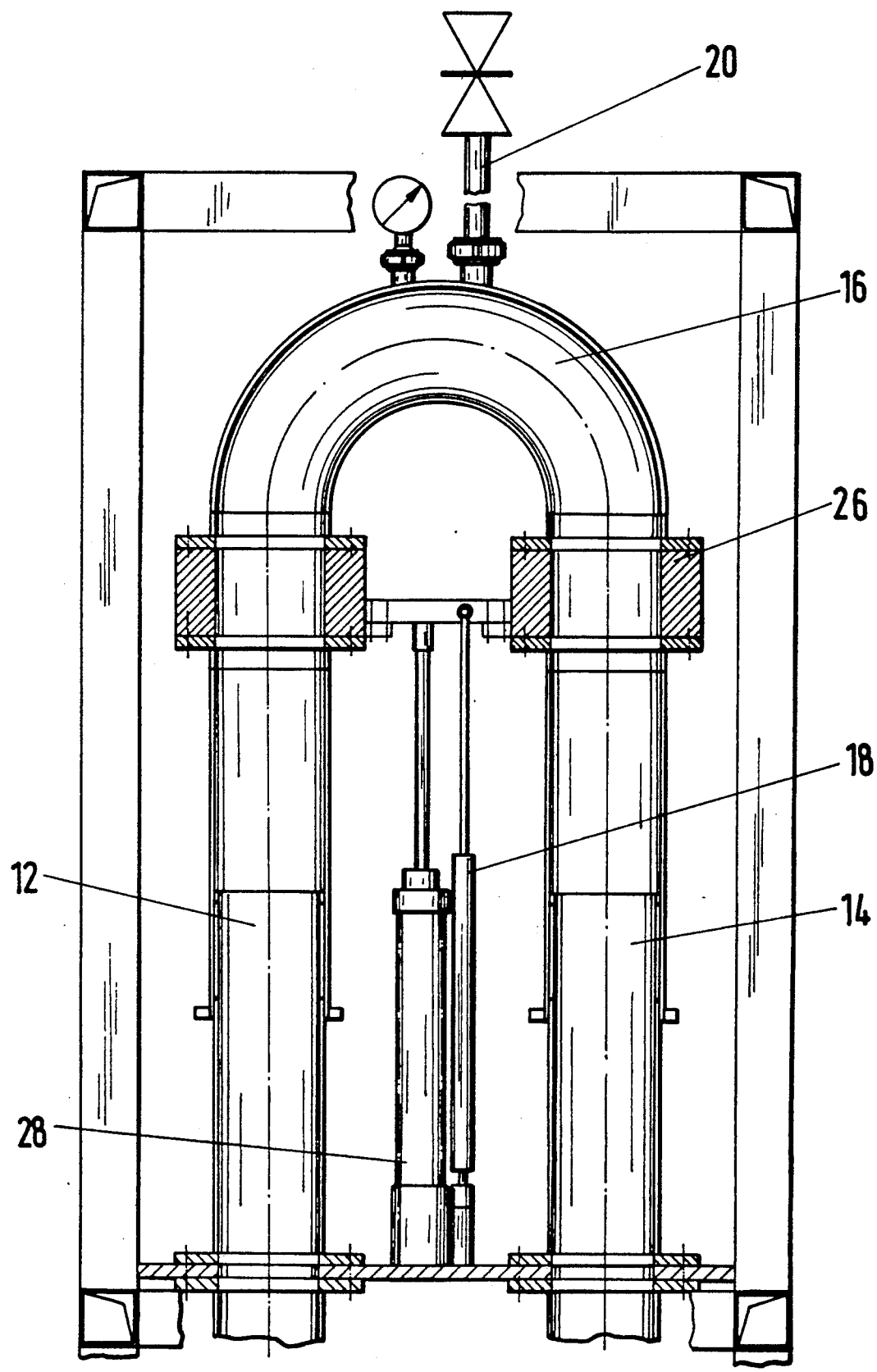
FIG. 3 is a view of the path in extended condition.

The sensing means 18 for detecting the instantaneous length of the path, provided in a preferred embodiment, makes it possible to regulate the delivery output in such a manner that, in its normal position, the path 10 assumes a position between the position shown in FIG. 2 of minimal length and the position shown in FIG. 3 with maximum length so that positive and negative pressure variations which occur can be continuously counteracted.

FIGS. 2 and 3 additionally show that in the event of a lengthening of the path 10 in a vertical plane, a vent device 20 is provided at the highest point of the U-shaped arch 16. The vent device serves to release the air which collects at the highest point of the arch. The vent device 20 makes it possible to remove air which has entered with the product upon start up of the system.

By the trombone-like development of the path 10, its length is lengthened or shortened by twice the stroke of the piston/cylinder unit 28. The mechanical development is simple; and the pressure of the piston/cylinder unit 28, which acts against the delivery pressure, can be determined in simple fashion.

The features of the invention disclosed in the above description, in the drawing and in the claims can be essential, both individually and in any desired combination, for the reduction to practice of the invention in its various embodiments.

What is claimed is:

1. A delivery line for conveying viscous or pasty material to be filled into a food can from a conveyer pump to a filling machine, comprising a delivery path developed in the form of a trombone tube having two sections which extend parallel to each other and a U-shaped arch, said delivery path extending in a vertical plane and being provided with a vent means at the highest point of said U-shaped arch, said sections having legs which cooperate telescopically and means for acting on said U-shaped arch and against the pressure of the conveyed material in said delivery path in a direction toward the shortening of the path.

2. A delivery line according to claim 1, including means for detecting the instantaneous length of the path.

3. A delivery line for conveying viscous or pasty material to be filled into a food can from a conveyer pump to a filling machine, comprising a delivery path developed in the form of a trombone tube having two sections which extend parallel to each other and a U-shaped arch, said sections having legs which cooperate telescopically, means for acting on said U-shaped arch and against the pressure of the conveyed material in said delivery path in the direction toward a shortening of the path and sensing means for detecting the instantaneous length of the path for regulating the delivery output from said conveyor pump.

4. A delivery line according to claim 1 or 3, wherein said means for acting on said U-shaped arch comprising a pneumatic or hydraulic cylinder/piston unit.

* * * * *